T. P. SHAFFNER.
CARTRIDGE FOR BLASTING.
No. 51,673. Patented Dec. 19, 1865.
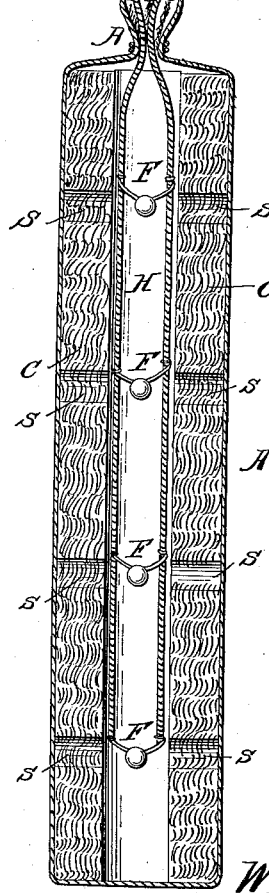

UNITED STATES PATENT OFFICE.

T. P. SHAFFNER, OF LOUISVILLE, KENTUCKY.

IMPROVEMENT IN CARTRIDGES FOR BLASTING.

Specification forming part of Letters Patent No. 51,673, dated December 19, 1865.

*To all whom it may concern:*

Be it known that I, TALIAFERRO P. SHAFFNER, of Louisville, in the county of Jefferson and State of Kentucky, have invented a new and useful Improvement in Cartridges for Blasting, which I term an "isolated hollow cartridge;" and I do hereby declare the following to be a full, clear, and exact description of the nature, construction, and operation of the same, sufficient to enable one skilled in the art to which it appertains to construct and use the same, reference being had to the accompanying drawings, which are made part of this specification, and in which—

Figure 1 is a longitudinal central section, and Fig. 2 is an elevation.

My invention consists in the combination of a hollow cartridge of explosive material provided with central and diverging spaces, which are occupied by a series of igniting-fuses and loose nitro-cotton, and protected on its exterior by a water-proof covering, which is tied around the electric wires, which enter the cartridge for the purpose of exploding it.

A is the water-proof covering, which I prefer to be of felt, treated with india-rubber dissolved in benzine; or it may be made of metal, according to circumstances, with an orifice closing around the entering electric wires P N by any compound capable of resisting moisture.

C is the cartridge of explosive material, made by preference of nitro-fiber compressed.

P N are the positive and negative electric wires, which pass to a battery.

F F are the fuses, which are connected by branch wires to the main wires P N.

The covering A, which incloses the cartridge, is tied around the wires P N, forming a neck and a tight joint, excluding water.

The purpose of this cartridge is for use beneath the surface of water, or under circumstances when it is exposed to dampness or wet, the water-proof covering holding the fuse in its place at the point of entry, and to protect its contents from injury.

S are spaces or openings through the wall of the cartridge, which proceed from the central space H. They are intended to expose a greater surface of the cartridge to the fire from the fuse or fuses, so as to make the explosion instantaneous.

It is designed to fill in the spaces H S S with loose nitro-cotton, which, receiving the fire from the ignited fuse, disseminates it through all parts of the interior surface of the cartridge.

Having described my invention, what I claim therein as new, and desire to secure by Letters Patent, is—

The combination of the hollow cartridge provided with fuses, as described, in it scentral space and with a water-proof covering on its exterior, as and for the purpose described.

TAL. P. SHAFFNER.

Witnesses:
EDWARD H. KNIGHT,
JAMES L. EWIN.